United States Patent [19]
Bauer et al.

[11] 3,880,990
[45] Apr. 29, 1975

[54] ORAL RUMINANT COMPOSITIONS COMPRISING A MEDICINAL SUBSTANCE ENCAPSULATED OR EMBEDDED IN A BASIC POLYMER

[75] Inventors: Kurt Bauer, O Pladen-Luetzenkirchen; Dieter Hoff, Leverkusen, both of Germany

[73] Assignee: Bayer Aktiengesellschaft, Leverkusen, Germany

[22] Filed: Feb. 16, 1972

[21] Appl. No.: 226,971

[30] Foreign Application Priority Data
Feb. 19, 1971 Germany............................ 2107917

[52] U.S. Cl..................................... 424/19; 424/78
[51] Int. Cl............................................... A61k 9/00
[58] Field of Search .............. 424/78, 79, 81, 19, 32

[56] References Cited
UNITED STATES PATENTS
3,511,907  5/1970  Marco et al. ......................... 424/78
3,629,392  12/1971  Banker et al. ........................ 424/78

FOREIGN PATENTS OR APPLICATIONS
920,866  8/1961  United Kingdom
1,097,054  12/1967  United Kingdom................... 424/78

Primary Examiner—Sam Rosen

[57] ABSTRACT

Orally administrable ruminant compositions are produced wherein at least one veterinary medicinal substance is encapsulated or embedded in a normally solid, physiologically acceptable, basic polymer. Such compositions are produced by dispersing the medicinal substance in a first solvent and adding thereto a second solvent which is miscible with the first solvent but in which the polymer and medicinal substance are substantially insoluble.

12 Claims, No Drawings

ORAL RUMINANT COMPOSITIONS COMPRISING A MEDICINAL SUBSTANCE ENCAPSULATED OR EMBEDDED IN A BASIC POLYMER

The present invention relates to veterinary compositions which are particularly suitable for administration to ruminants. More particularly, the present invention comprises a veterinary composition which comprises at least one veterinary medicinal substance encapsulated or embedded in a basic polymer.

It is known in the art to encapsulate active ingredients in acid soluble macromolecules in order to protect such substances against various external influences which may adversely effect them. See for example:

| | |
|---|---|
| Deutsche Auslegeschrift | 1 493 245 |
| U.S. Patent | 2 976 214 |
| U.S. Patent | 2 940 901 |
| German Patent | 1 108 857 |
| German Patent | 1 090 381 |
| Belgian Patent | 735 073 |

In ruminants, ingested feed first passes into the rumen, where it is pre-digested or degraded by fermentation. This pre-digested feed passes back into the mouth in small portions via the reticulum and is there salivated and ruminated. Only then does it pass via the omasum into the abomasum. There, the actual digestion and resorption starts and then continues in the subsequent sections of the intestines.

It is important in preparing a veterinary composition intended for administration to ruminants to protect the active ingredient against the influence of the gastric juice of the rumen so that the active substance will retain its full or substantially complete activity when it reaches the particular locations where resorption takes place.

Materials which protect the active ingredient against degradation by the juice of the rumen should be insoluble in the juice of the rumen but must dissolve rapidly in the acid juice of the abomasum. Such materials must be resistant to the enzymes or micro-organisms which are usually present in the juice of the rumen. In order to embed or encapsulate active ingredients in such protective materials, the protective materials must also be soluble in certain organic solvents. In addition, the protective materials must be toxicologically harmless, that is substantially non-toxic and inert.

We have now found, according to the present invention, a veterinary composition useful for administration to ruminants and which is insoluble in the juice of the rumen and soluble in the juice of the abomasum which comprises at least one veterinary medicinal substance as hereinafter defined, encapsulated or embedded in a basic polymer. According to one embodiment of the present invention, two or more veterinary medicinal substances may be encapsulated or embedded in the basic polymer.

The compositions of the present invention are produced by homogenously dispersing at least one veterinary medicinal substance in a solution of a basic polymer in a first solvent and adding a second solvent which is miscible with the first solvent but in which the polymer and at least one veterinary medicinal substance are substantially insoluble.

As basic polymers in which the medicinal substance can be embedded or encapsulated, the following can for example be used:

i. Imidamine polymers ("rumen lacquer"), [Belgian Pat. 703,820] or copolymers of methacrylic acid and basic methacrylic acid amides; for example a copolymer of 1-amino-3-dimethyl-aminopropyl-methacrylic acid amide and methacrylic acid methyl ester.

ii. Polyacrylic acid derivatives with basic groups; for example Eudragit E (a polyacrylic acid derivative, in which the carboxyl groups are wholly or partially esterified with dimethylaminoethanol or similar aminoalcohols). [W. Falck and G. Rothgang, Pharm. Ind. 22, 441 (1960) G. Rothgang, APV-Informationsdienst 4, 108 (1961)].

iii. Aminocellulose derivatives; for example benzylamino-methylcellulose, diethylaminomethylcellulose, 1-piperidyl-ethyl-hydroxyethylcellulose, and benzylamino-ethylhydroxy-ethylcellulose. [I. Utsumi, T. Ida and T. Usuki: Studies on Protective Coating I., J. PHARM. SOC. JAPAN 78, 115–118 (1958)].

iv. Aminoacid esters of cellulose or cellulose derivatives; for example N,N-diethylglycinemethylcellulose, acetylcellulose-p-amino-benzoate, ethylhydroxyethylcellulose-p-aminobenzoate and cellulose acetate-diethylaminoacetate. [T. Ida: Studies on Protective Coating IV, J. PHARM. SOC. JAPAN 78, 619–623 (1958)].

v. Polyvinylamines, for example N-benzyl-polyvinylamine, N-phenyl-polyvinylamine and piperidino-polyvinylamine; but, above all, copolymers of vinylamine and vinyl acetate, because of their better solubility in organic solvents. [T. Ida: Studies on Protective Coating V. J. PHARM. SOC. JAPAN 78, 651–654 (1958)].

vi. Polyvinylaminoacetals; for example polyvinyl-N,N-diethylaminoacetacetal, polyvinyl-N-benzylaminoacetacetal, polyvinylpiperidinoacetacetal, copolymers of vinyl-N,N-diethylamino-acetacetal or vinyl-N-dodecylaminoacetacetal or vinylpiperidinoacetacetal and vinyl acetate. [T. Ida: Studies on Protective Coating VI, J. PHARM. SOC. JAPAN 78, 655–58 (1958)].

vii. Poly(vinylpyridine) derivatives; for example poly(2-vinyl-pyridine), poly(4-vinylpyridine), poly(2-methyl-5-vinylpyridine) and poly(2-vinyl-5-ethylpyridine), and copolymers of these vinyl compounds with each other or with other vinyl compounds or with acrylic or methacrylic copolymers. [I. Utsumi, T. Ida, S. Takehashi and N. Sugimoto, Studies on protective Coating IX, J. Pharm. Sci. 50, 592–597 (1961), T. Ida, S. Kishi, S. Takahashi and I. Utsumi, Protective Coating XIII: Amphoteric Polyvinylpyridine Derivatives. J. Pharm. Sci. 51, 1061–1068 (1962)].

viii. Saccharide-p-aminobenzoate; for example sucrose-p-aminobenzoate, lactose-p-aminobenzoate, glucose-p-aminobenzoate, fructose-p-aminobenzoate, mannitol-p-aminobenzoate and sorbitol-p-aminobenzoate. [T. Ida: Studies on Protective Coating III, J. PHARM. SOC. JAPAN 78, 616–18 (1958)].

ix. Amino derivatives of sugars, polyalcohols and starch products; for example dodecylamino-N-glucoside, dodecylamino-N-xyloside, dodecylamino-N-lactoside, benzylamino-sucrose, benzyl-amino-dextrin and benzylamino-mannitol. [T. Ida: Studies on Protective Coating II, J. PHARM. SOC. JAPAN 78, 501–504 (1958)].

x. Polystyrenes with basis groups; for example dimethylaminoethylpolystyrene, acetyldimethylaminomethylpolystyrene, diethylaminomethylpolystyrene, acetyldiethylaminomethylpolystyrene, piperidylmethylpolystyrene, N-propyl-diethanolamine-methylpolystyrene, acetylpiperidylmethylpolystyrene and acetyldiethanolaminemethylpolystyrene. [I. Utsumi, T. Ida, S. Kishi, JAPAN. J. PHARM. CHEM. 32, 802 (1961)].

The following veterinary medicinal substances can for example be utilized in the composition described above:

"Bilevon" [5,5'-dichloro-2,2'-dihydroxy-3,3'-dinitro-biphenyl];
Ferrous sulphate;
Ferrous fumarate;
Salts of piperazine;
Quinine and its salts;
DDVP [dimethyldichloro vinyl phosphate, which before incorporation into the basic polymer must be converted into the solid state by a suitable process, such as adsorbtion on a carrier substance (eg. kaolin, bentonite)];
"Neguvon" [Dipterex = 0,0-dimethyl-(1-hydroxy-2,2,2-trichloroethyl)-phosphonate = Trichlorfon];
"Marbadal" [1-Sulfanilyl-2-thiorea compound with γ-amino-p-toluene sulfonamide = Sulfatolamide];
Vitamins [eg. Vitamin A, C, D and E];
Antiobiotics [eg. penicillins and tetracyclines].

It will be noted that this illustrative list includes not only therapeutic substances but also substances added as dietary supplements. Thus, the term "veterinary medicinal substances" as used in this specification includes, as well as purely therapeutic substances, any substance administered to animals to protect them from infection or disease, to encourage growth, to supplement their diet, or otherwise to improve their value or well-being.

When two or more veterinary medicinal substances are combined in the present composition, these medicinal substances may have the same or different effects.

For example, Ferrous sulphate and a vitamin may be combined as a dietary supplement.

The embedding of the veterinary substances in the polymers is often made more difficult by the fact that during the conversion of the embedding mixture in the solid state very viscous masses are produced.

The tackiness of the mixture can be reduced according to the process of the present invention to such an extent that the mixture can be further processed without difficulties. Thus, the process steps wherein the at least one veterinary medicinal substance is homogenously dispersed in a solution of the polymer in a first solvent and then a second solvent is added which is miscible with the first solvent but in which the polymer and the at least one additional substance are substantially insoluble, enables the tackiness of the mixture to be reduced and aids processing.

The second solvent must be miscible with the first solvent and must also be either a poor solvent or a non-solvent for both the polymer and the medicinal substance.

The process according to the invention is preferably therefore carried out by working the at least one medicinal substance, preferably in a finely powdered form, into the polymer solution, in an appropriate kneading machine, to give a moist, plastic mass, to which the second solvent is then added.

Preferred basic polymers which dissolve more or less easily in an acid medium to form a salt are copolymers of styrene and lameic anhydride with N-dialkylalkylenediamines; "rumen lacquer"; polymers of N-dialkylaminoalkylmethacrylate; and polymers based on other methacrylic acid esters, for example Eudragit E.

Methylene chloride, chloroform, ethyl acetate, acetone, toluene, and isopropanol, or mixtures of these, can for example be used as the first solvent, in which the polymer is dissolved.

The embedding mixture becomes unusually viscous and tacky on working in the kneader. It can on occasion happen that the kneader stops or is damaged, and the mass can only forcibly be removed from the equipment. Before this occurs, a certain amount of the second solvent is, according to the invention, added to the mixture to counteract the viscosity and tackiness.

Suitable second solvents are those which on the one hand, are miscible without difficulty with the solvent in which the basic polymer has beforehand been dissolved, but on the other hand are non-solvents or only poor solvents for the medicinal substance and the polymer.

Possible solvents maleic this nature are for example carbon tetrachloride, n-hexane, cyclohexane and ligroin, and mixtures thereof. After addition of the second solvent to the embedding mixture, with the kneader running, the viscous mass begins to turn granular. It can without difficulty be removed from the kneader, comminuted to the desired particle size and dried in suitable driers.

For encapsulating 5,5'-dichloro-2,2'-dihydroxy-3,3'-dinitro-biphenyl by this process, 3 to 50 wt.%, more preferably 7 to 25 wt.% (referred to the total composition) of a polymer with basic groups are preferably used.

The following non-limitative examples more particularly point out and illustrate the present invention:

Example 1

72.0 kg of 5,5'-dichloro-2,2'-dihydroxy-3,3'-dinitro-biphenyl (I) are uniformly moistened in a kneader by slow addition of 32.0 kg of the rumen lacquer solution (25% content) in chloroform, to which 0.8 kg of chloroform have further been added for dilution, and the mixture is thoroughly kneaded.

Subsequently, approx. 25.5 kg of carbon tetrachloride are slowly run in whilst the kneader is running. The initially tacky and viscous mixture is thus converted into a granular mass which can then easily be emptied out of the kneader. The granules, which are still moist, are subsequently comminuted by means of a sieving machine and dried in a drier at 100°C.

Example 2

0.6 kg of Eudragit E granules are dissolved in approx. 2.5 kg of methylene chloride while stirring. 5.4 kg of (I) are worked into a paste with this solution in a kneader, and thoroughly kneaded. The temperature of the kneader is brought to approx. 40°C by means of a heating device and approx. 4.5 kg of carbon tetrachloride are run in while continuing kneading. This produces granules which are no longer tacky and which are coarsely comminuted by means of a sieving device and are dried in a circulating air drying cabinet at 60°C.

Example 3

2.7 kg of (I) are thoroughly worked, in a kneader, with a solution of 0.3 kg of Eudragit E granules in 0.5 kg of chloroform and 0.75 kg of benzene. Addition of approx. 0.6 kg of ligroin yields a granular material which after comminution through a perforated plate sieving machine is dried in a suitable drier at 50°C.

Example 4

0.3 kg of Eudragit E granules are dissolved in a mixtue of 0.75 kg of methylene chloride and 0.25 kg of isopropanol and the solution is slowly added to 2.7 kg of (I) in a kneader. The mixture is thoroughly worked. Thereafter, approx. 1.5 kg of cyclohexane are run in and after a short kneading time the embedded active substance can easily be removed from the kneader. After grinding by means of a suitable mill, the materials is dried at 80°C.

Example 5

A solution of 0.6 kg of Eudragit E granules in approx. 2.5 kg of chloroform is added gradually to 5.4 kg of (I) in a suitable mixing machine and the whole is thoroughly mixed. The mixer is warmed to about 40°C and approx 3.0 kg of a mixture of equal parts of isopropanol and carbon tetrachloride are added. After a granular material has formed, it is removed from the kneader, sieved through a sieve of 4 mm hole size and dried at 60°C.

Example 6

3.0 kg of powdered ferrous sulphate are thoroughly mixed in a kneader with a solution of 0.75 kg of benzylaminomethylcellulose in about 1.5 kg of a mixture of equal parts of chloroform and methanol. The kneader is warmed to about 35°C and about 2.0 kg of ethyl acetate are allowed to flow in slowly. A granular material is obtained, which after comminution is dried in a suitable drier at 50°C.

Example 7

7.5 kg of the 1-sulfanilyl-2-thiourea salt of $\gamma$-amino-p-toluene sulfonamide are thoroughly mixed in a suitable mixer with a solution of 0.75 kg of benzylaminosucrose in about 2.5 kg of methanol. Finally the mixer is heated to about 35°C and about 2.0 kg of a mixture of equal parts of chloroform and carbon tetrachloride are allowed to flow in.

When the product is no longer sticky it is taken out of the mixer, comminuted, and finally dried in a suitable drier at about 70°C.

Example 8

1.0 kg of a copolymer of N-ethylvinylamine and vinylacetate are dissolved with stirring in about 3.0 kg chloroform. 10.0 kg of ferrous fumarate are thoroughly worked in with this solution in a suitable mixer. The mixer is warmed to about 40°C and about 3.5 kg of benzene added. After a granular material has formed, it is taken out of the mixer comminuted by means of a mill and dried at about 50°C.

Example 9

To 1.7 kg of streptomycin sulphate in a mixer are added a solution of 0.2125 kg of diethylaminomethylpolystyrene in about 0.85 kg chloroform and thoroughly kneaded in. Finally about 1.2 kg of absolute ethanol were added in small portions. Thus is obtained a granular material, which is freed in a suitable vacuum drier from the solvents.

Example 10

2.25 kg of mannitol-p-aminobenzoate are dissolved in about 6.0 kg of acetone and added to 15.0 kg of piperazine phosphate in a suitable mixer. When the product is thoroughly mixed with the lacquer solution, 4.5 kg of chloroform are allowed to flow in portionwise while the mixer temperature is brought to about 40°C. After a short time the granulate can be taken out and after a comminution is dried in a suitable drier at 50°C.

Example 11

In a suitable mixing machine a solution of 0.15 kg of a copolymer of 2-vinylpyridine and methacrylic acid in about 0.75 kg of chloroform are added to 1.5 kg of tetracycline hydrochloride and thoroughly mixed in. By means of a heating device the temperature of the mixer is brought to about 30°C and about 0.9 kg of carbon tetrachloride are allowed to flow in slowly. After a short further mixing time the granular material can, after comminution, be dried in a suitable drier.

Example 12

1.2 kg of polyvinyl-N,N-diethylaminoacetacetal are dissolved in 6 litres of isopropanol. 12.0 kg of quinine hydrochloride were thoroughly kneaded in with this solution in a kneader. As soon as a homogenous mass is obtained, 3 to 5 litres of petroleum ether or cyclohexane are added slowly. A granular material is formed, which can be easily taken out of the kneader and further worked up.

As will be appreciated from the above set forth description as well as from the examples, veterinary compositions according to the present invention can be produced which comprise one veterinary medicinal substance encapsulated or embedded in a basic polymer or two or more veterinary medicinal substances encapsulated or embedded in a basic polymer.

What is claimed is:

1. In the process for the preparation of orally administered ruminant compositions in which at least one veterinary medicinal substance is encapsulated or imbedded in a normally solid physiologically acceptable basic polymer, the improvement which comprises homogeneously dispersing the medicinal substance in a solution of a basic polymer in a first solvent selected from the group consisting of methylene chloride, chloroform, ethyl acetate, acetone, toluene, isopropanol and mixtures of two or more thereof and adding thereto a second solvent selected from the group consisting of carbon tetrachloride, n-hexane, cyclohexane, ligroin and mixtures thereof which is miscible with the first solvent but in which said polymer and medicinal substance are substantially insoluble, said second solvent being added in at least sufficient quantity to produce a nontacky solid, and drying said non-tacky solid, said composition being insoluble in the rumen and soluble in the abomasum.

2. The improvement according to claim 1 wherein the veterinary medicinal substance is dispersed in said first solvent in a finely powdered form.

3. The improvement according to claim 1 wherein the basic polymer is an imidamine polymer, a copolymer of methacrylic acid and a basic methacrylic acid amide, a polyacrylic acid derivative with basic groups, an aminocellulose derivative, an aminoacid ester of cellulose, an ester cellulose derivative, a polyvinyl-amine, a polyvinylaminoacetal, a poly(vinylpyridine), a p-aminobenzoate of saccharide, an amino derivative of a sugar, polyalcohol or starch, or a polystyrene with basic groups.

4. The improvement according to claim 1 wherein the basic polymer is a copolymer of styrene and maleic anhydride with N-dialkylalkylenediamine; rumen lacquer; a polymer of N-dialkylaminoalkylmethacrylate; or a polymer of a methacrylic acid ester.

5. A process according to claim 1 wherein the medicinal substance is worked into the polymer solution in a kneader to produce a moist plastic mass to which the second solvent is then added.

6. The improvement according to claim 1 wherein said polymer is present in the amount of from 3 to 50 percent by weight based on the total composition.

7. The improvement according to claim 6 wherein said polymer is present in the amount of from 7 to 25 percent by weight based on the total composition.

8. The improvement according to claim 5 wherein the temperature of the kneader is from 30° C to 40° C.

9. The improvement according to claim 5 wherein said polymer is present in the amount of from 3 to 50 percent by weight based on the total composition.

10. The improvement according to claim 9 wherein said polymer is present in the amount of from 7 to 25 percent by weight based on the total composition.

11. The improvement according to claim 8 wherein said polymer is present in the amount of from 3 to 50 percent by weight based on the total composition.

12. The improvement according to claim 11 wherein said polymer is present in the amount of from 7 to 25 percent by weight based on the total composition.

* * * * *

UNITED STATES PATENT OFFICE
CERTIFICATE OF CORRECTION

Patent No. 3,880,990     Dated April 29, 1975

Inventor(s) Kurt Bauer et al.

It is certified that error appears in the above-identified patent and that said Letters Patent are hereby corrected as shown below:

On the Title page, in item [30] "2107917"

should read -- 2107917.4 --.

Signed and Sealed this ninth Day of September 1975

[SEAL]

Attest:

RUTH C. MASON
Attesting Officer

C. MARSHALL DANN
Commissioner of Patents and Trademarks